United States Patent
Kawell, Jr. et al.

(10) Patent No.: US 8,046,840 B2
(45) Date of Patent: *Oct. 25, 2011

(54) DISTRIBUTING ACCESS TO A DATA ITEM

(75) Inventors: Leonard M. Kawell, Jr., Concord, MA (US); Thomas R. Diaz, Lexington, MA (US); Mary Ellen Heinen, Concord, MA (US); Roger J. Heinen, Jr., Islesboro, ME (US)

(73) Assignee: Adobe Systems Incorporated, San Jose, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 12/405,092

(22) Filed: Mar. 16, 2009

(65) Prior Publication Data

US 2009/0183005 A1     Jul. 16, 2009

Related U.S. Application Data

(63) Continuation of application No. 11/619,917, filed on Jan. 4, 2007, now Pat. No. 7,516,327, which is a continuation of application No. 11/082,215, filed on Mar. 15, 2005, now Pat. No. 7,249,382, which is a continuation of application No. 09/167,888, filed on Oct. 7, 1998, now abandoned.

(51) Int. Cl.
*G06F 7/00* (2006.01)
(52) U.S. Cl. .............. 726/27; 726/4; 713/170; 713/171; 705/54
(58) Field of Classification Search .................... 705/54; 713/170, 171; 726/4, 27
See application file for complete search history.

(56) References Cited

U.S. PATENT DOCUMENTS

| | | | |
|---|---|---|---|
| 4,924,378 A | 5/1990 | Hershey et al. | |
| 5,109,413 A | 4/1992 | Comerford et al. | |
| 5,175,851 A | 12/1992 | Johnson et al. | |
| 5,247,575 A | 9/1993 | Sprague et al. | |
| 5,629,980 A | 5/1997 | Stefik et al. | |
| 5,734,823 A | 3/1998 | Saigh et al. | |
| 5,884,308 A | 3/1999 | Foulston | |
| 6,032,216 A | 2/2000 | Schmuck et al. | |
| 6,122,631 A | 9/2000 | Berbec et al. | |

(Continued)

FOREIGN PATENT DOCUMENTS

EP    0695997    2/1996

(Continued)

OTHER PUBLICATIONS

Lewis, "New Forms, Electronic Books Turn a Page", New York Times, Circuits, Section G, p. 1, col. 1, Jul. 2, 1998.

(Continued)

*Primary Examiner* — Eleni Shiferaw
*Assistant Examiner* — Paul Callahan
(74) *Attorney, Agent, or Firm* — Fish & Richardson P.C.

(57) ABSTRACT

A method is provided for use in distributing access to a data item. The method includes allowing multiple transfers between computers of a single instance of permission to gain access to the data item, the transfers occurring across data connections and including a first transfer between a first computer and a second computer and a subsequent transfer between the second computer and a third computer, wherein at any one time only one computer retains the instance of permission and is able to use the instance of permission to gain access to the data item.

14 Claims, 15 Drawing Sheets

U.S. PATENT DOCUMENTS

| | | | |
|---|---|---|---|
| 6,138,119 A | 10/2000 | Hall et al. | |
| 6,230,267 B1 | 5/2001 | Richards et al. | |
| 6,260,145 B1 | 7/2001 | Komura et al. | |
| 7,516,327 B2 * | 4/2009 | Kawell et al. | 713/171 |

FOREIGN PATENT DOCUMENTS

| | | |
|---|---|---|
| EP | 0715245 | 6/1996 |
| EP | 1125182 | 1/2003 |
| WO | WO96/27155 | 9/1996 |
| WO | WO97/20274 | 6/1997 |
| WO | WO98/08344 | 2/1998 |

OTHER PUBLICATIONS

Schneier, "Applied Cryptography", $2^{nd}$ Edition, Section 3.1, pp. 47-52, 1996.

Japan Patent Office, Reason for Rejection dated Jun. 26, 2009 for Japanese Patent Application No. 2000-575010, filed Oct. 7, 1999 (Translation), 4 pages.

* cited by examiner

DISTRIBUTING ACCESS TO A DATA ITEM

CROSS-REFERENCE TO RELATED APPLICATIONS

This application is a continuation application of, and claims priority to, U.S. patent application Ser. No. 11/619,917, entitled DISTRIBUTING ACCESS TO A DATA ITEM which was filed on Jan. 04, 2007, now U.S. Pat. No. 7,516,327, which is a continuation of, and claims priority to, U.S. patent application Ser. No. 11/082,215, entitled DISTRIBUTING ACCESS TO A DATA ITEM, which was filed on Mar. 15, 2005, now U.S. Pat. No. 7,249,382, which is a continuation of U.S. patent application Ser. No. 09/167,888, entitled DISTRIBUTING ACCESS TO A DATA ITEM, which was filed on Oct. 7, 1998, now abandoned. The disclosures of the above applications are incorporated herein by reference in their entirety.

BACKGROUND

A computer data item such as a file that contains the text of a book or an arrangement of data that represents an audio or video rendering or recording may be copied and distributed via removable media such as a floppy diskette or a CD-ROM or over a computer network such as the Internet. In some cases, a data item is intended to be copied and distributed freely, with little or no control over access to the data item. In other cases, control over access is attempted by physical means, such as by exercising some control over the number of pieces of removable media that are produced, or by copy protection methods that impede the ability of a computer to produce a copy of the data item.

As shown in FIG. 1, in existing electronic book distribution systems, a data item that represents the contents of a book ("book data") is copied (e.g., across a network connection) from a central source to book reading devices (i.e., book viewing devices) in a hub-and-spoke arrangement.

SUMMARY

In general, in one aspect, the invention features a method for use in distributing access to a data item. The method includes allowing multiple transfers between computers of a single instance of permission to gain access to the data item, the transfers occurring across data connections and including a first transfer between a first computer and a second computer and a subsequent transfer between the second computer and a third computer, wherein at any one time only one computer retains the instance of permission and is able to use the instance of permission to gain access to the data item.

Implementations of this or another aspect of the invention may include one or more of the following features. The method may include using an encryption key to impede unauthorized access to the data item. At least one of the transfers of permission may include the transfer of a first encryption key, and the method may include using a second encryption key to encrypt the first encryption key prior to transfer. The first encryption key may include a secret key and the second encryption key may include one of the keys in a public/private key set. The method may include using highly secure circuitry to help ensure that at any one time only one of the computers retains and is able to use the instance. The highly secure circuitry may include a smartcard computer or a de-encryptor. The method may include storing an encryption key in the highly secure circuitry, and may include using the encryption key only within the highly secure circuitry. The method may include determining whether a computer is authorized to receive the instance of permission to gain access to the data item, or, according to an expiration time, rendering at least one of transfers temporary. The method may include, in the temporary transfer, transmitting a copy of an encryption key from a sender computer to a recipient computer, and, at the expiration time, erasing the copy of the encryption key from the recipient computer. The method may include, in one of the transfers, transmitting a copy of an encryption key from a sender computer to a recipient computer, and erasing the copy of the encryption key from the sender computer. The method may include associating at least one of the transfers with a transfer of funds, or distinguishing between different instances of permission to gain access to the data item. At least one of the computers may include a Web server computer or a book viewing device. The book viewing device may include a viewing screen and data communications circuitry.

In general, in another aspect, the invention features a method including: in accordance with access distribution parameters that are specific to a data item and that were established by a first computer, transferring, across a data connection from a second computer to a third computer and independently of the first computer, permission to gain access to the data item.

In general, in another aspect, the invention features a method including: impeding a change to the number of computers that are allowed to gain access to a data item, independently of data connection transfers between computers of permission to gain access to the data item.

In general, in another aspect, the invention features a method for use in distributing access to a data item. The method includes providing a first computer with permission to gain access to the data item; providing the permission by data connection to a second computer substantially simultaneously with removing the permission from the first computer; and providing the permission by data connection to a third computer substantially simultaneously with removing the permission from the second computer.

In general, in another aspect, the invention features a method including: rendering accountably fungible an instance of permission data that allows a computer to gain access to book data.

In general, in another aspect, the invention features a method for use in distributing access to a book data item. The method includes associating highly secure circuitry with a device that is able to send and receive access data that is necessary to gain access to the book data item, the highly secure circuitry including a computer processor and a program memory and being able to substantially prevent an unauthorized transfer of the access data from the device.

In general, in another aspect, the invention features a method for use in distributing access to a book data item. The method includes: at a publisher computer, storing publisher permission data that allows a number A of end-user computers to gain access to the book data item; based on the publisher permission data, providing a distributor computer with distributor permission data that allows a number B of end-user computers to gain access to the book data item; changing the publisher permission data so that the publisher permission data allows only a number A-B of end-user computers to gain access to the book data item; based on the distributor permission data, providing a retailer computer with retailer permission data that allows a number C of end-user computers to gain access to the book data item; changing the distribution permission data so that the distributor permission data allows only a number B-C of end-user computers to gain access to the book data item; based on the retailer permission data, providing an end-user computer with end-user permission data that allows 1 end-user computer to gain access to the book data item; and changing the retailer permission data so that the retailer permission data allows only a number C−1 of end-user computers to gain access to the book data item.

Among the advantages of the invention are one or more of the following. Access to a data item (i.e., permission to use the data item) can be controlled without excessively burdening users (e.g., consumers) of the data item or excessively hindering the scalability of distribution by traditional data copying techniques. In at least some cases, acquiring the data item under authorization can be made easier than acquiring a corresponding physical rendering (e.g., a paper book or a music compact disc), and nearly instant gratification can be achieved for the end-user. Access to the data item can be made fungible and therefore valuable. The distribution of works (e.g., books, audio recordings, pictures) can be limited in number without conventional reliance on physical manufacturing, which limiting can help maintain the value of the works. An accounting can be made of the number of end-users that have access to a data item. An entity can lend a data item to an end-user much as a library lends a book. A data item can be transferred across a data connection but can made fully usable regardless of whether the data connection is available at the time of use. Full or nearly full advantage may be taken of the Internet and the World-Wide Web in the distribution of access to a data item.

Other features and advantages will become apparent from the following description, including the drawings, and from the claims.

DETAILED DESCRIPTION

Figure 1:
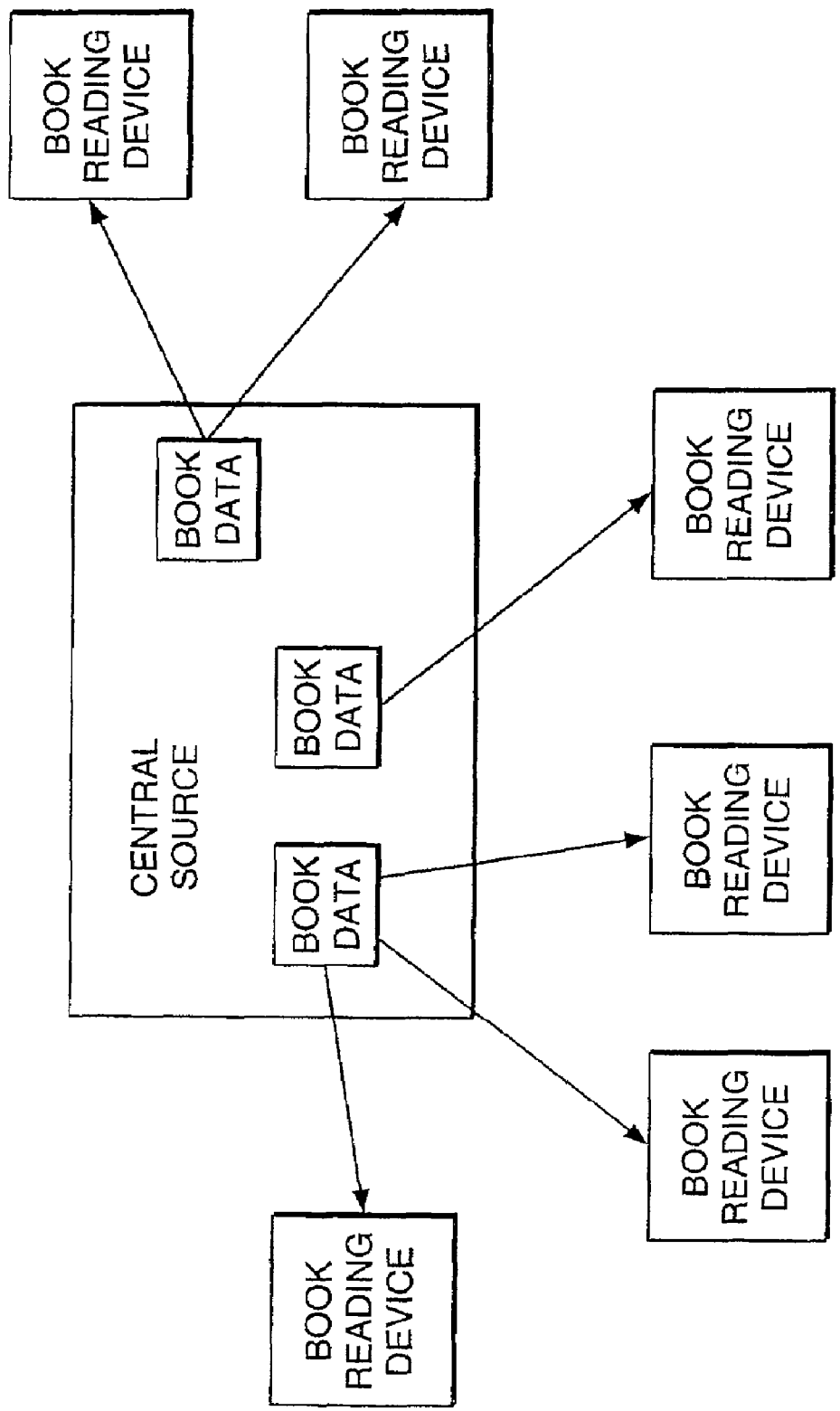
FIG. 1 is a block diagram of a prior art book data distribution system in which book reading devices receive book data directly from a central source.
Figure 2:
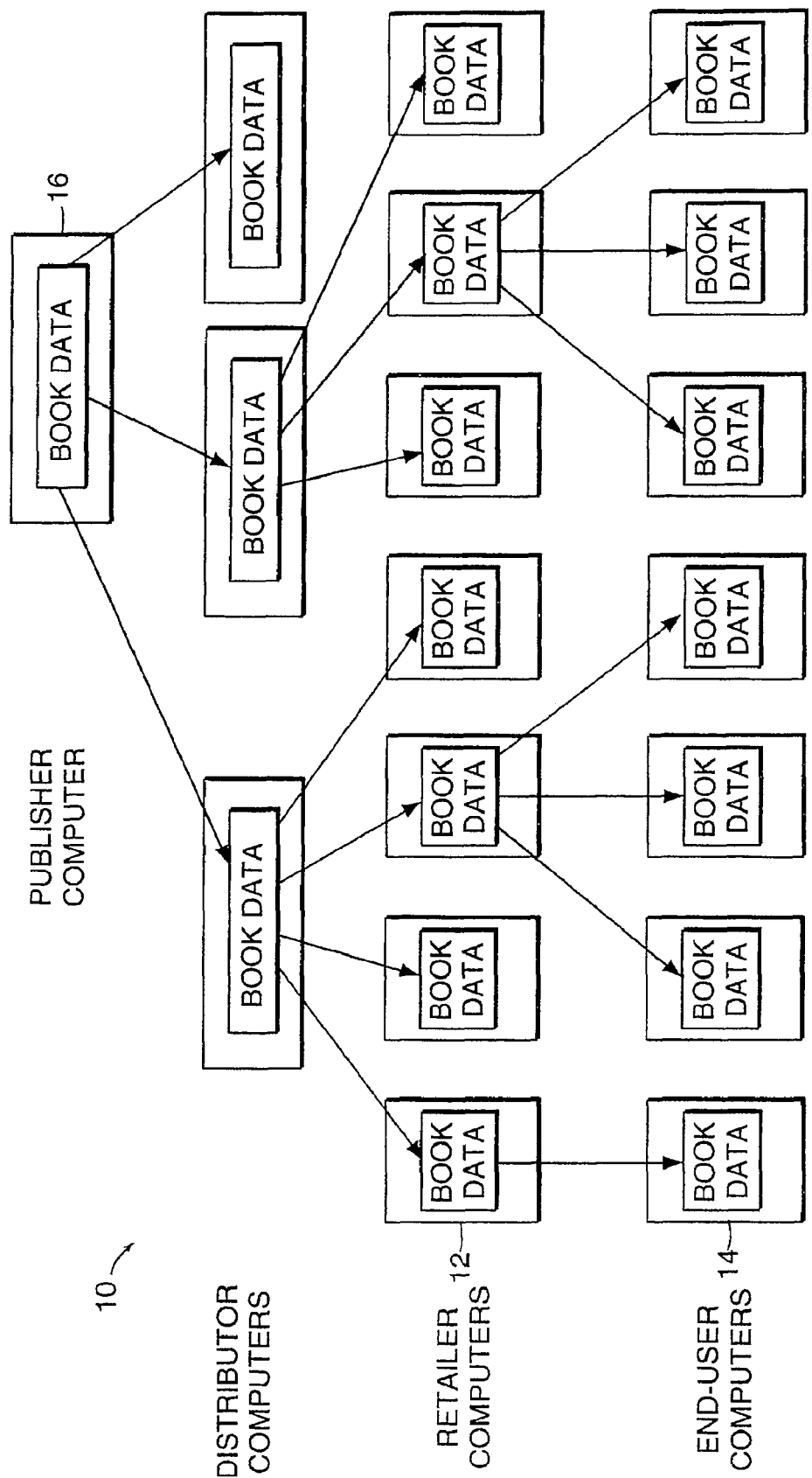
FIG. 2 is a block diagram of a book data distribution system in which book data is passed from a publisher computer to distributor computers to retailer computers to end-user computers.

FIG. 2 illustrates a controlled data distribution system 10 in which a data item such as data including the text of a book ("book data") is distributed from a sender computer (e.g., retailer computer 12) to a recipient computer (e.g., end-user computer 14) in accordance with distribution control parameters determined at least in part by an originating computer (e.g., publisher computer 16), regardless of whether the originating computer is available at the time of the distribution from the sender computer to the recipient computer. Thus, distribution is not only convenient but also private, because in at least some cases the only computers that ever have any information about a particular instance of distribution are the sender computer and the recipient computer.

Figure 3:
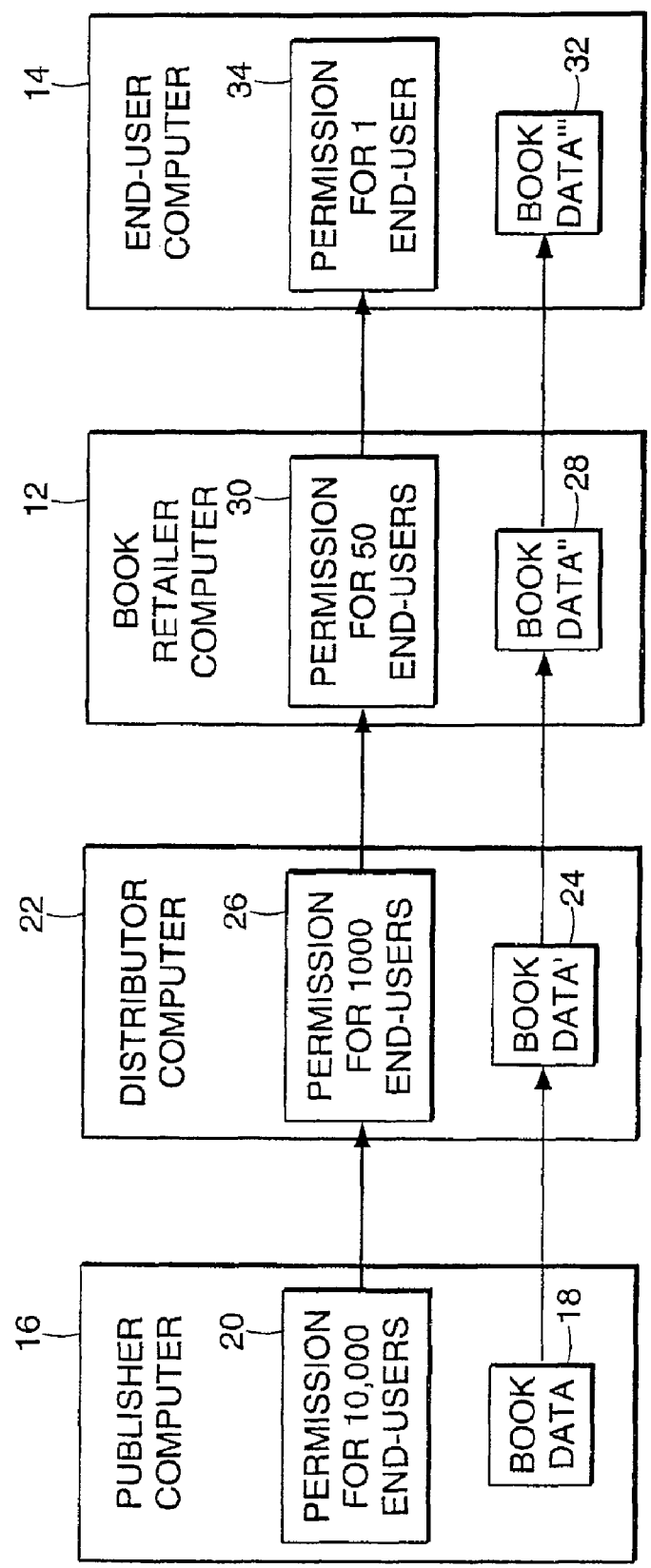
FIG. 3 is a block diagram of transfers of permission among publisher, distributor, retailer, and end-user computers.

FIG. 3 shows a general example in which an original copy 18 of a book data item is held at the publisher computer which has permission data 20 to allow up to 10,000 end-user computers (e.g., book reader computers) to have access to the book data item. In such a case, the publisher computer provides a distributor computer 22 with a copy 24 of the book data item and permission data 26 to allow access by 1,000 end-user computers, which leaves the publisher computer with permission data to allow access by 9,000 end-user computers. Further, in turn, the distributor computer provides the retailer computer with a copy 28 of the book data item and permission data 30 to allow access by 50 end-user computers, and the retailer computer provides end-user computer 14 with a copy 32 of the book data item and permission data 34 to allow access. Thus, the publisher, distributor, retailer, and end-user computers form a distribution network in which permission is distributed from the publisher computer to end-user computers much as printed books are distributed from a print publisher to consumers in a printed book distribution system: permitted access may be regarded as a fixed resource such that the maximum number of end-user computers that are allowed to gain access to the book data item is not affected by distribution.

Figure 4:
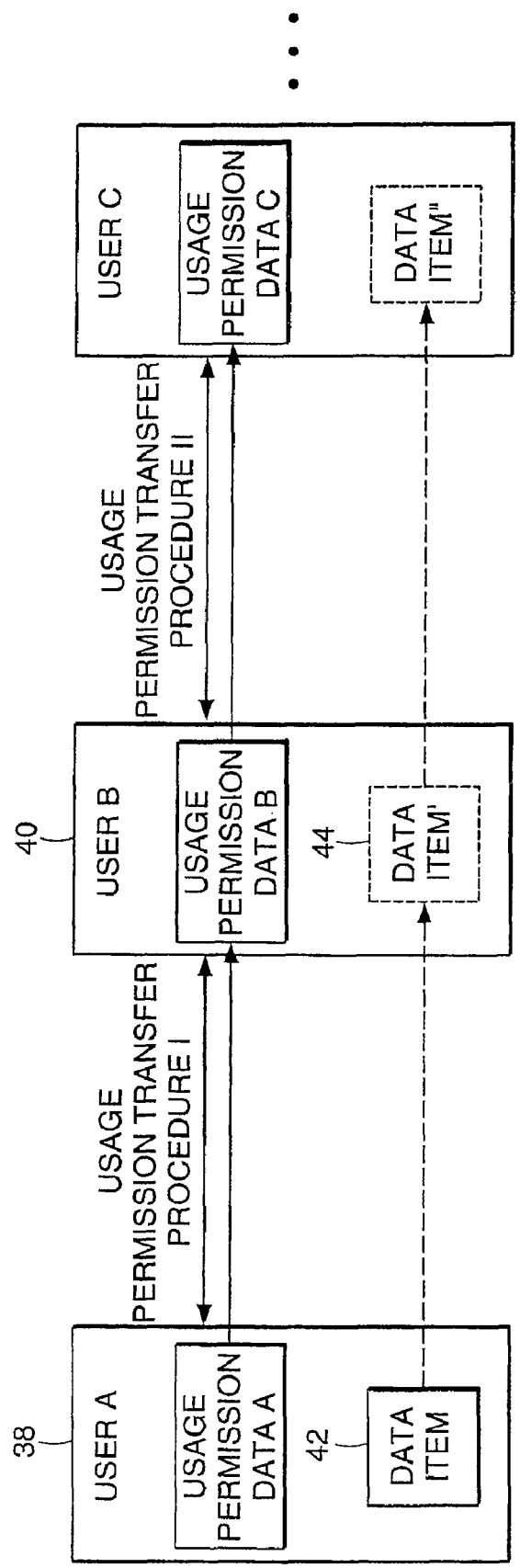
FIG. 4 is a block diagram of transfers of permission data among user computers.
Figure 5:
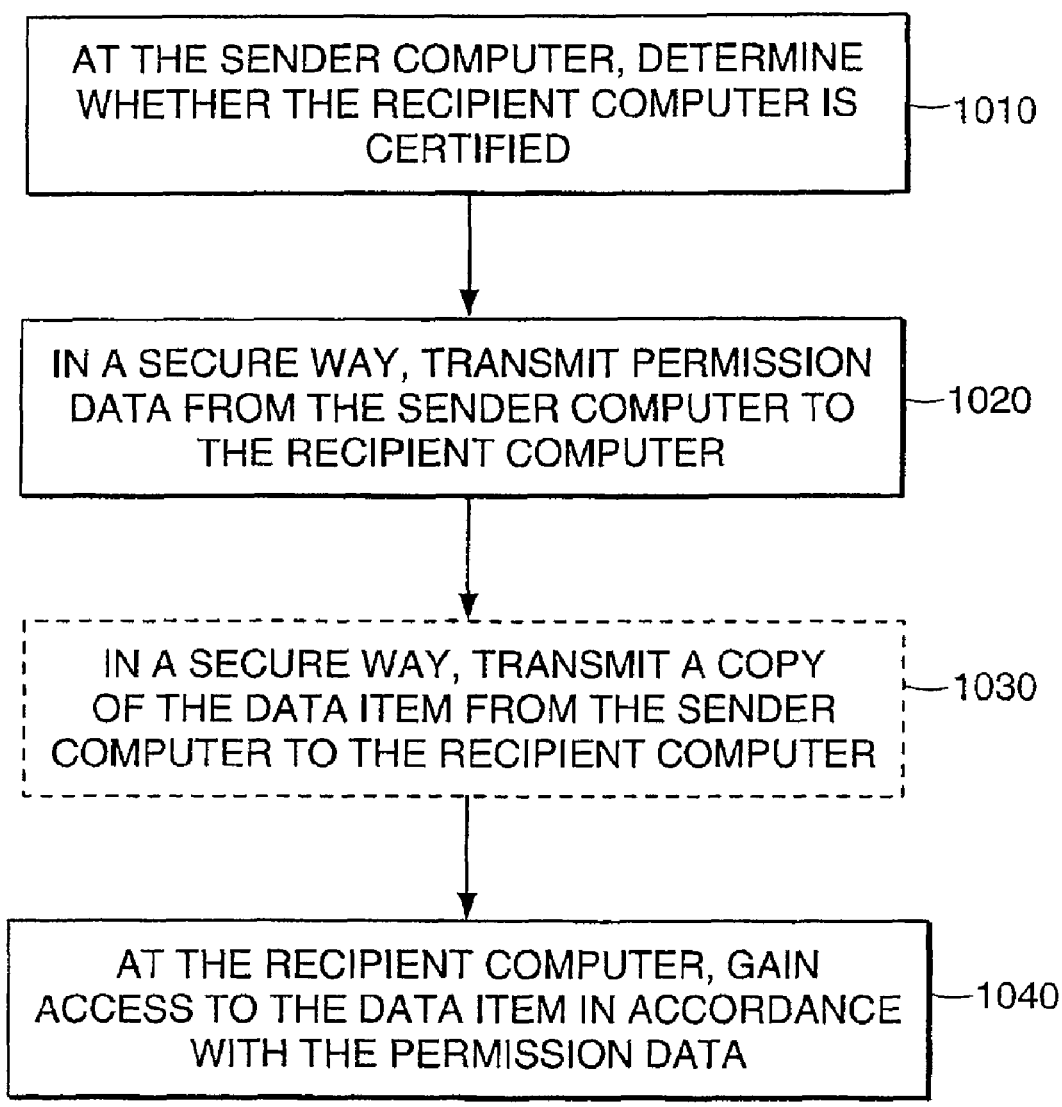
FIG. 5 is a flow diagram of a usage permission transfer procedure.

As shown in FIG. 4, controlled distribution as described above need not take place in a hierarchy (e.g., from publisher computer down to end-user computers), and may occur between any two computers that execute according to a usage permission transfer procedure 36 illustrated in FIG. 5 (a more detailed example is described below in connection with FIGS. 8-14). At the sender computer (e.g., User A's computer 38), it is determined whether the recipient computer (e.g., User B's computer 40) has been certified by an organization that certifies devices intended to make use of data items, and is therefore authorized to be granted access to the data item (e.g., item 42) (step 1010). The purpose of the organization is to help ensure that only devices that conform to rules of the organization are allowed to gain access to data items associated with the organization. For example, the organization may not certify a device that lacks a highly secure clock or a highly secure program memory, or that has not been demonstrated to use encryption tools reliably.

If the recipient computer has been certified, the sender computer transmits permission data (e.g., usage permission data B based on usage permission data A) in a highly secure way to the recipient computer (step 1020). If a copy of the data item is stored at the sender computer, a copy of the data item (e.g., data item 44) may be transmitted in a highly secure way from the sender computer to the recipient computer (step 1030). The recipient computer gains access to the data item in accordance with the permission data (step 1040).

It is important that formulation and transmission of the permission data be accomplished in a highly secure way, because control over distribution depends on such formulation and transmission being performed only under authorized conditions. While it may be impossible to completely block unauthorized actions by determined actors with significant resources (e.g., professional pirates), high security can be effective to help to discourage others (e.g., student hackers), and to help to make clear that the distribution is intended to be controlled and is not intended to add the data item to the public domain.

To help ensure high security, each of the sender computers and recipient computers may rely on encryption devices known as secret keys and public/private key sets, and may include a highly secure mechanism, which may handle one or more of the keys or key sets, or encrypted or unencrypted data, or both. A secret key (also known as a symmetric key) is a string of data (e.g., 40 bits) that may be used to encrypt other data in a way that allows the other data to be de-encrypted using the same secret key. A public/private key set includes two strings of data (e.g., 1024 bits each) that cannot be derived from each other and that are matched such that other data that has been encrypted by using either one of the two strings can be de-encrypted only by using the other of the two strings. Typically, one of the two strings ("public key") is not kept confidential and the other of the two strings ("private key") is kept highly confidential. See Public Key Cryptography Standards, RSA Laboratories, Security Dynamics, Inc., November 1993, and RSA Public Key Crypto System, RSA Data Security Division, Security Dynamics, Inc., 1982.

Figure 6:
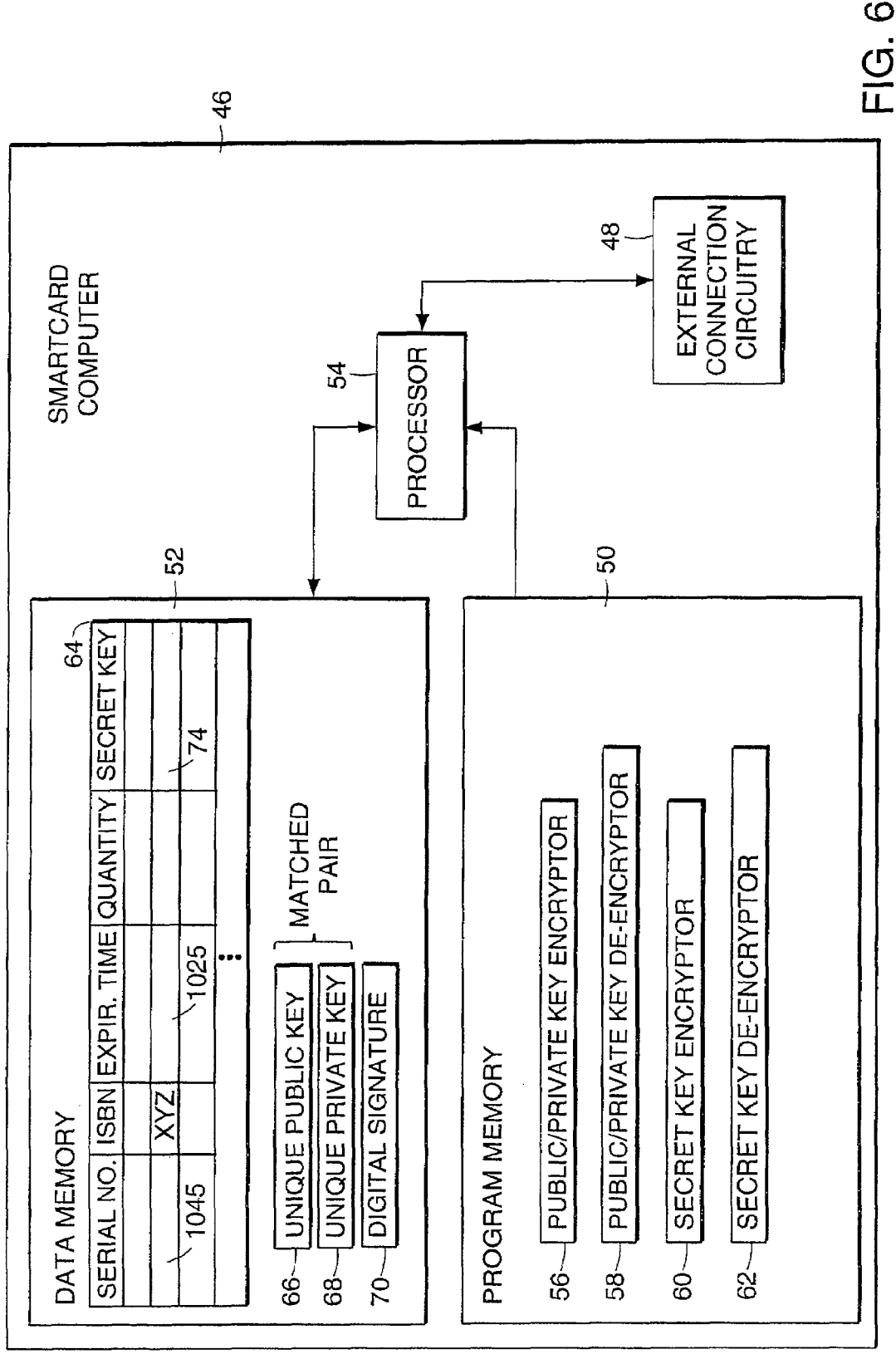
FIG. 6 is a block diagram of a smartcard computer.
Figure 7:
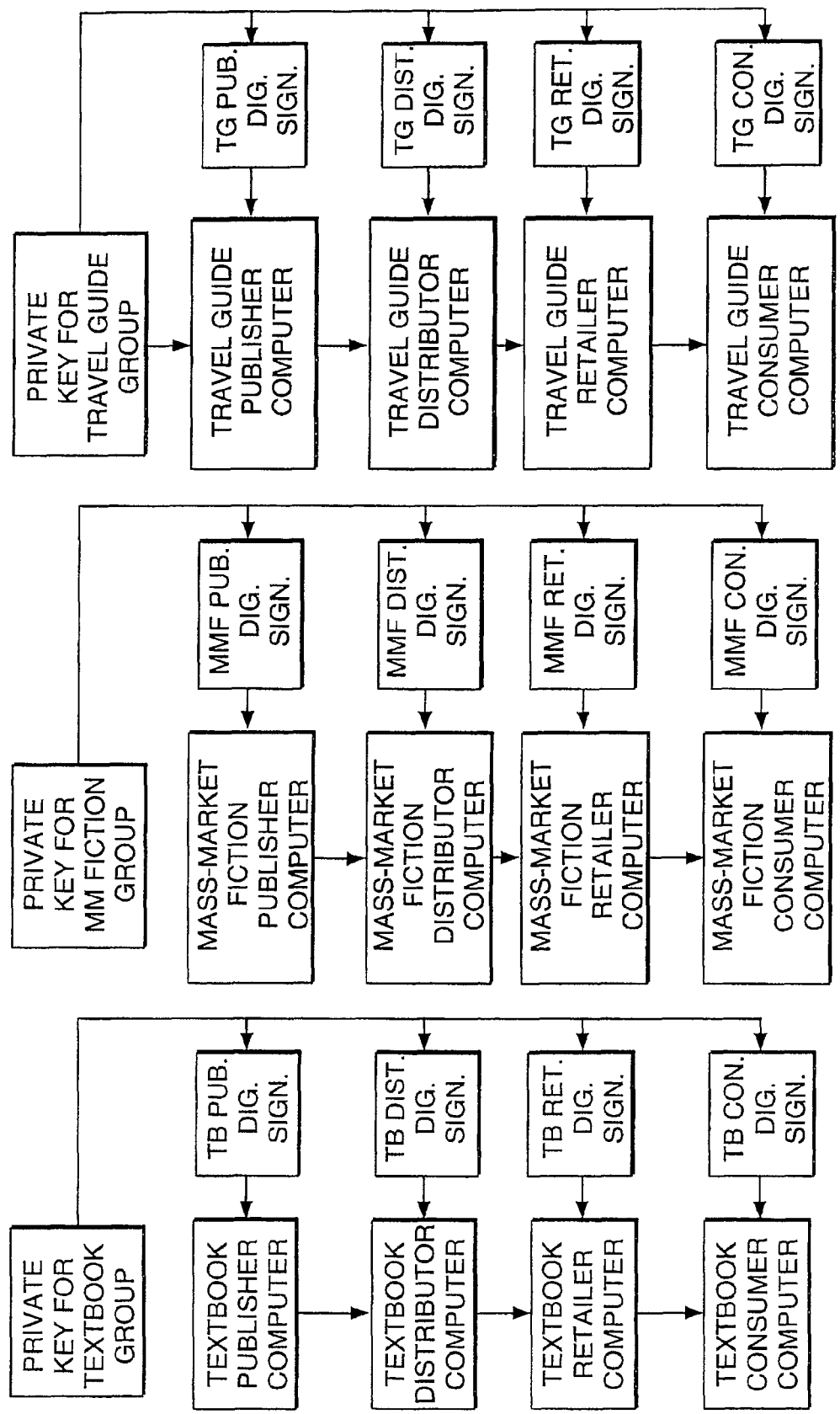
FIG. 7 is a block diagram of groups and private keys.
Figure 8:
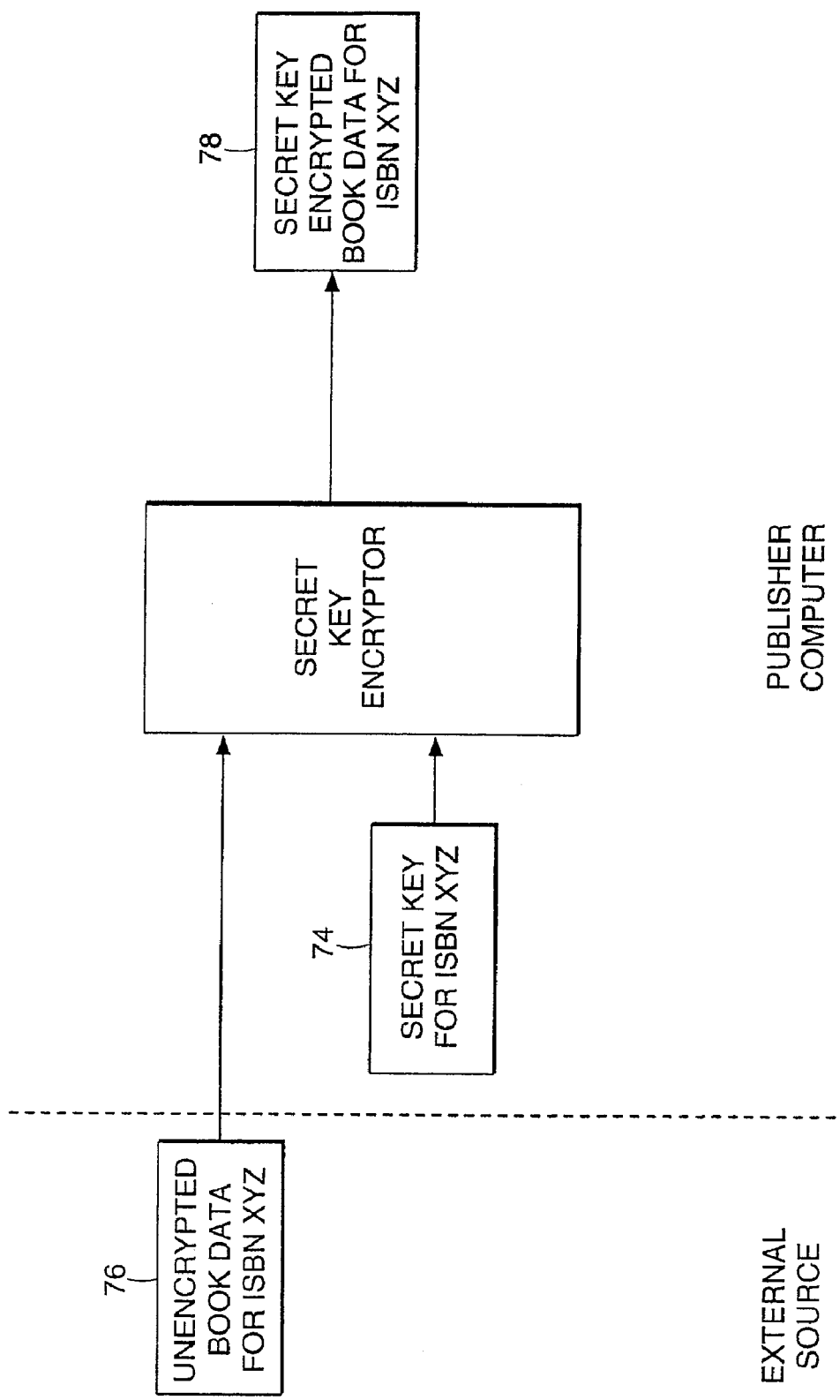
FIGS. 8-11 are block diagrams of data flows in a usage permission transfer procedure.
Figure 9:
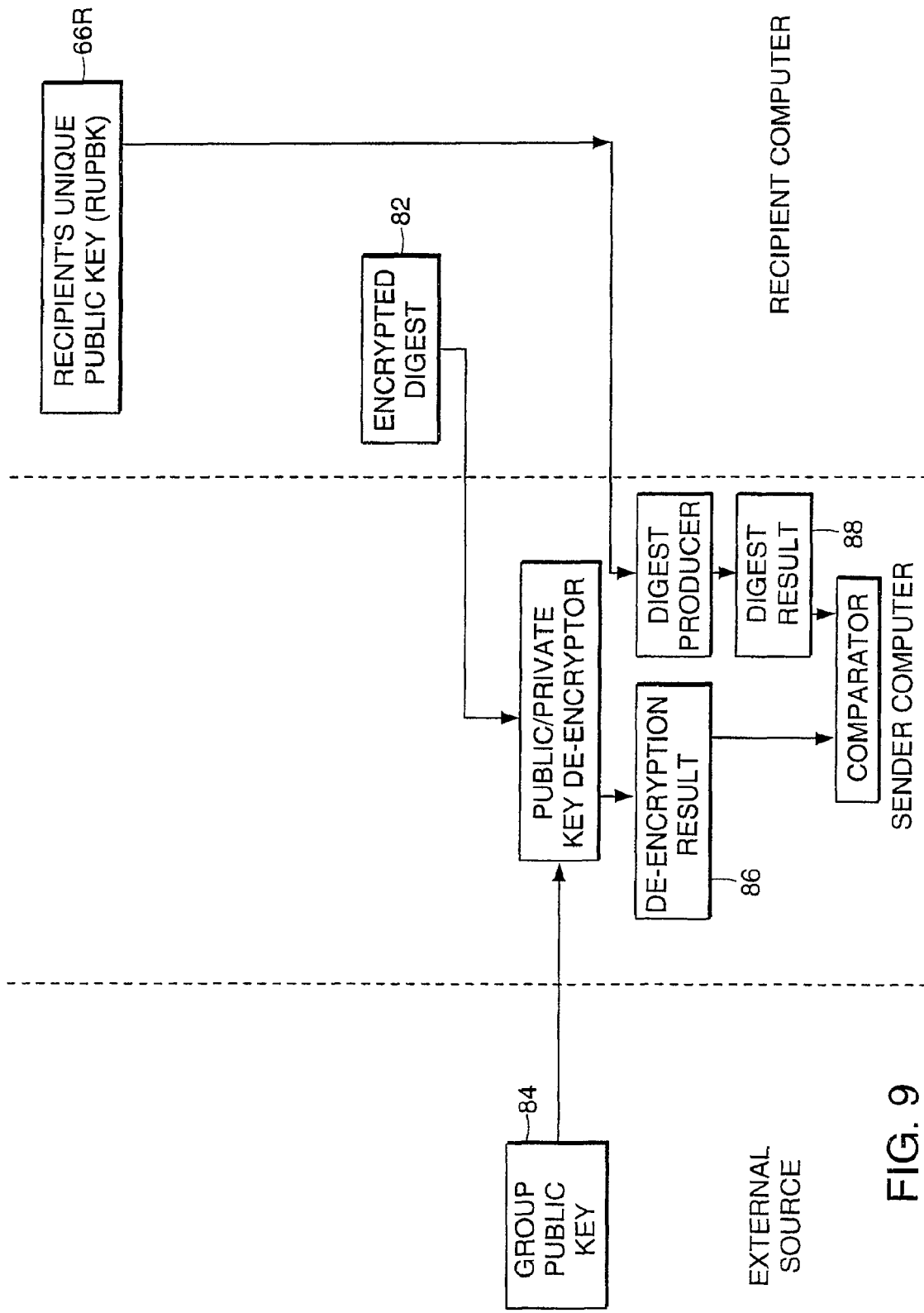

A conventional general-purpose computer can be used to generate the secret key and the public/private key set, which can be stored in conventional computer files, as can data that has been or is intended to be encrypted by using one or more of the keys. In at least some cases, security is enhanced if the highly secure mechanism handles the keys and includes a smartcard computer 46 (FIG. 6) (e.g., a Gemplus GemXpresso), which is physically sealed to impede unauthorized access to internal components, and has connection circuitry 48 that provides the only authorized means for exchanging data with circuitry outside the smartcard computer. The smartcard computer also has a program memory 50, a data memory 52, and a processor 54 that communicates with the connection circuitry and executes according to software stored in the program memory to implement a public/private key encryptor 56, a Public/private key de-encryptor 58, a secret key encryptor 60, and a secret key de-encryptor 62. A permission data bank 64, a public key 66, a private key 68, and a digital signature 70 are stored in the data memory (e.g., when the smartcard computer is manufactured). The digital signature (also referred to as the encrypted digest) is the result produced by generating a digest version of the public key (e.g., by applying a hash function to the public key) and then using a group private key (FIG. 7) to encrypt the digest version.

Each smartcard computer's public/private key set is different (i.e., unique), but the group private key is the same for every smartcard computer in a group. In a specific embodiment, the smartcard computer also stores an identification of the entity with which the smartcard computer is associated, if the entity is a publisher, distributor, or retailer, and stores an anonymous serial number instead if the entity is an end-user (e.g., a consumer), to help protect the privacy of the end-user. In alternative versions of the specific embodiment, the digital signature is supplemented or replaced by a digital certificate, which is the result created by using the group private key to encrypt the identification.

The smartcard computer may be able to execute software programs formatted according to a programming language known as Java.

In a specific embodiment, only the publisher computer is provided with a secret key encryptor (e.g., because the other computers are not originators of encrypted data items) and only the end-user computer is provided with the secret key de-encryptor (e.g., because the other computers do not display or otherwise make significant use of the data items).

FIGS. 8-14 illustrate a detailed example 72 of the usage permission transfer procedure. A secret key 74 (e.g., a randomly-generated 40-bit number) is used to encrypt book data 76 to produce secret key encrypted book data 78 (step 2010), which is stored at a sender computer (step 2020). (In a specific embodiment, the secret key is also appended to the secret key encrypted book data.)

The encrypted digest and the recipient computer's unique public key are transmitted from the recipient computer to the sender computer (steps 2050, 2060). At the sender computer, a group public key 84 is used to de-encrypt the encrypted digest to produce a de-encryption result 86 (step 2070), and a digest result 88 is produced from the recipient's unique public key (step 2080). At the sender computer, the digest result is compared to the de-encryption result to determine whether the recipient computer has been certified as described above and is therefore authorized to receive book data (step 2090), and if it is determined that the recipient computer has not been certified, the recipient computer's requests for book data are refused (step 2100).

Figure 10:
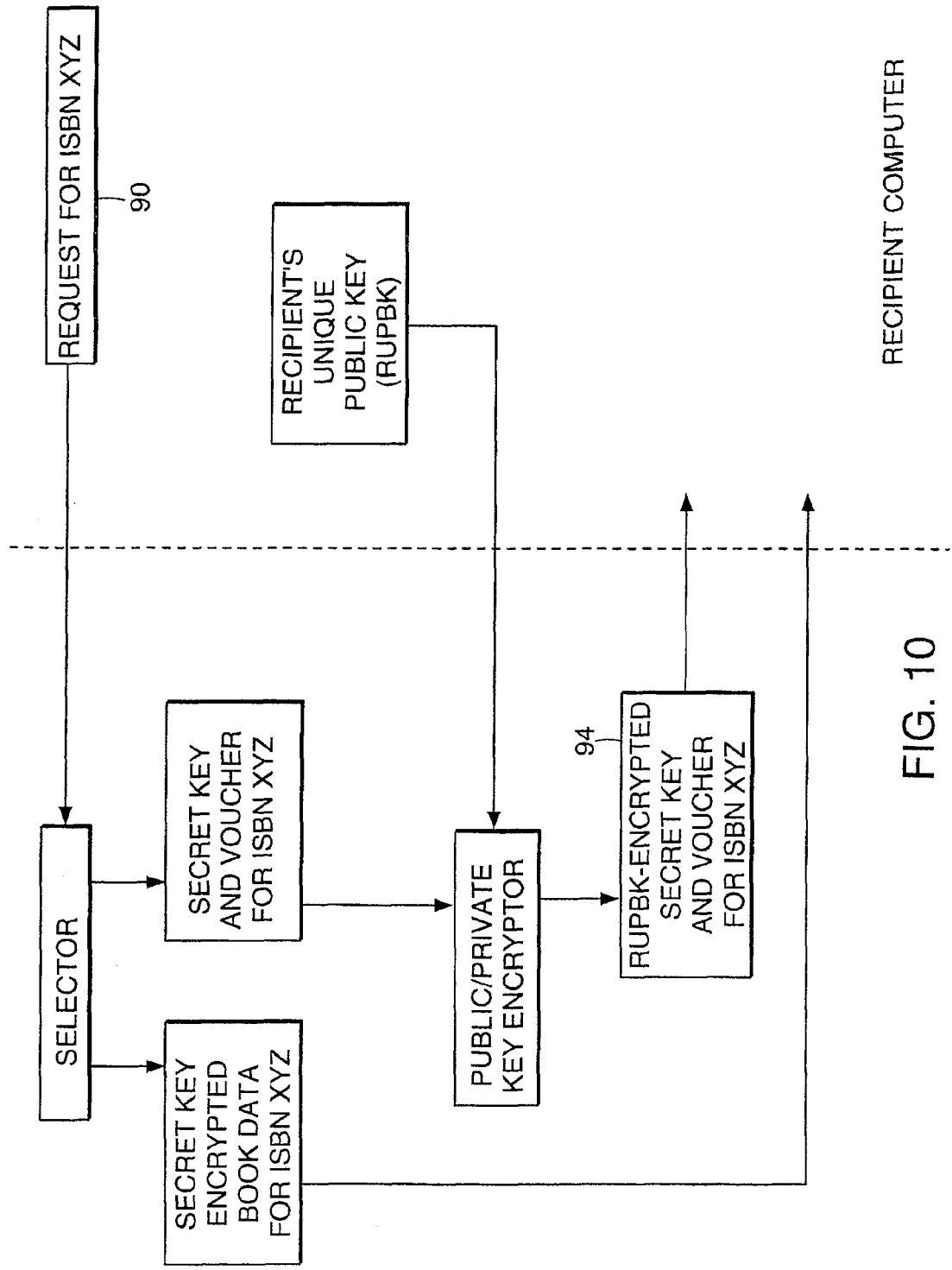
Figure 11:
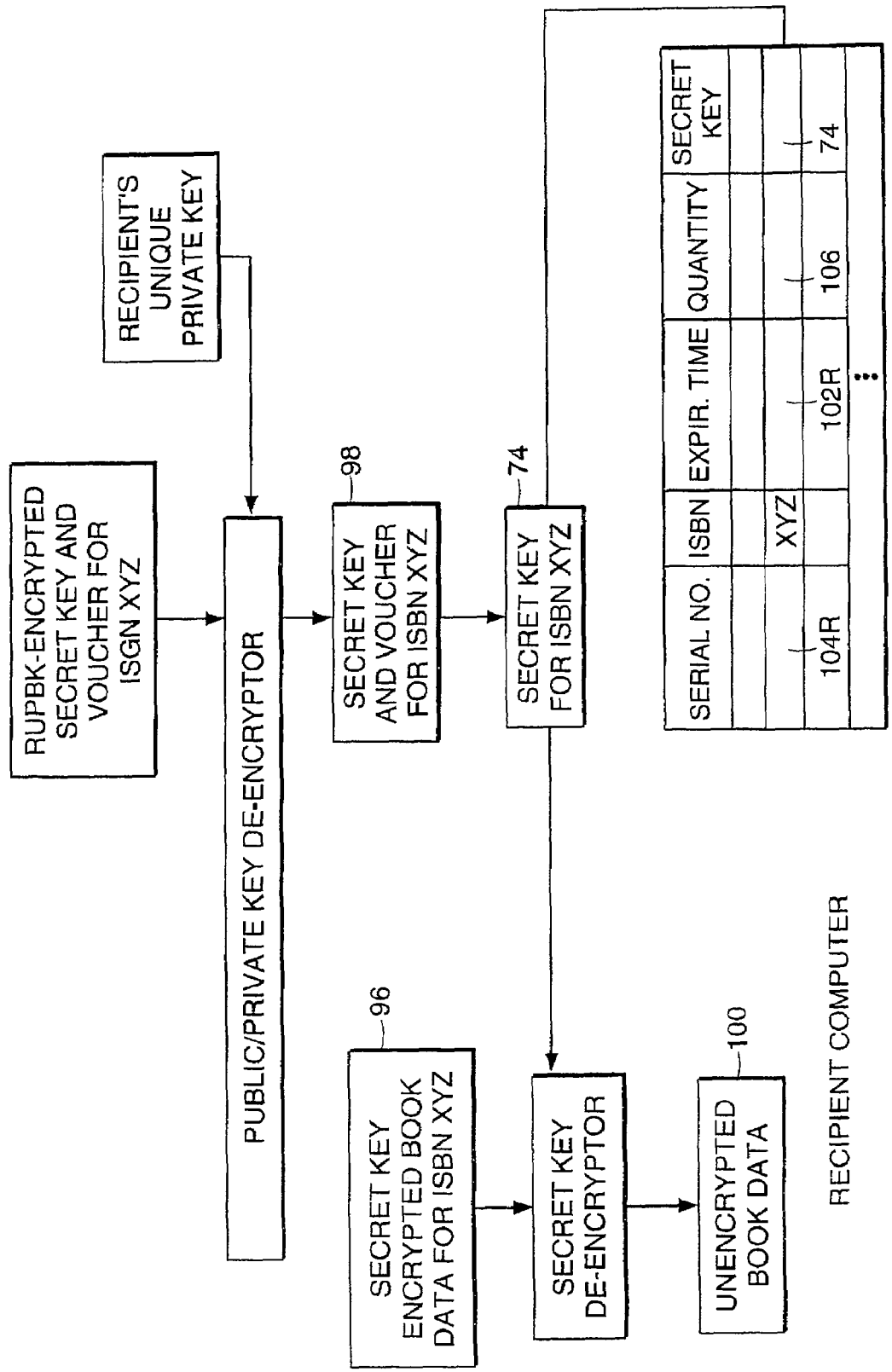
Figure 12:
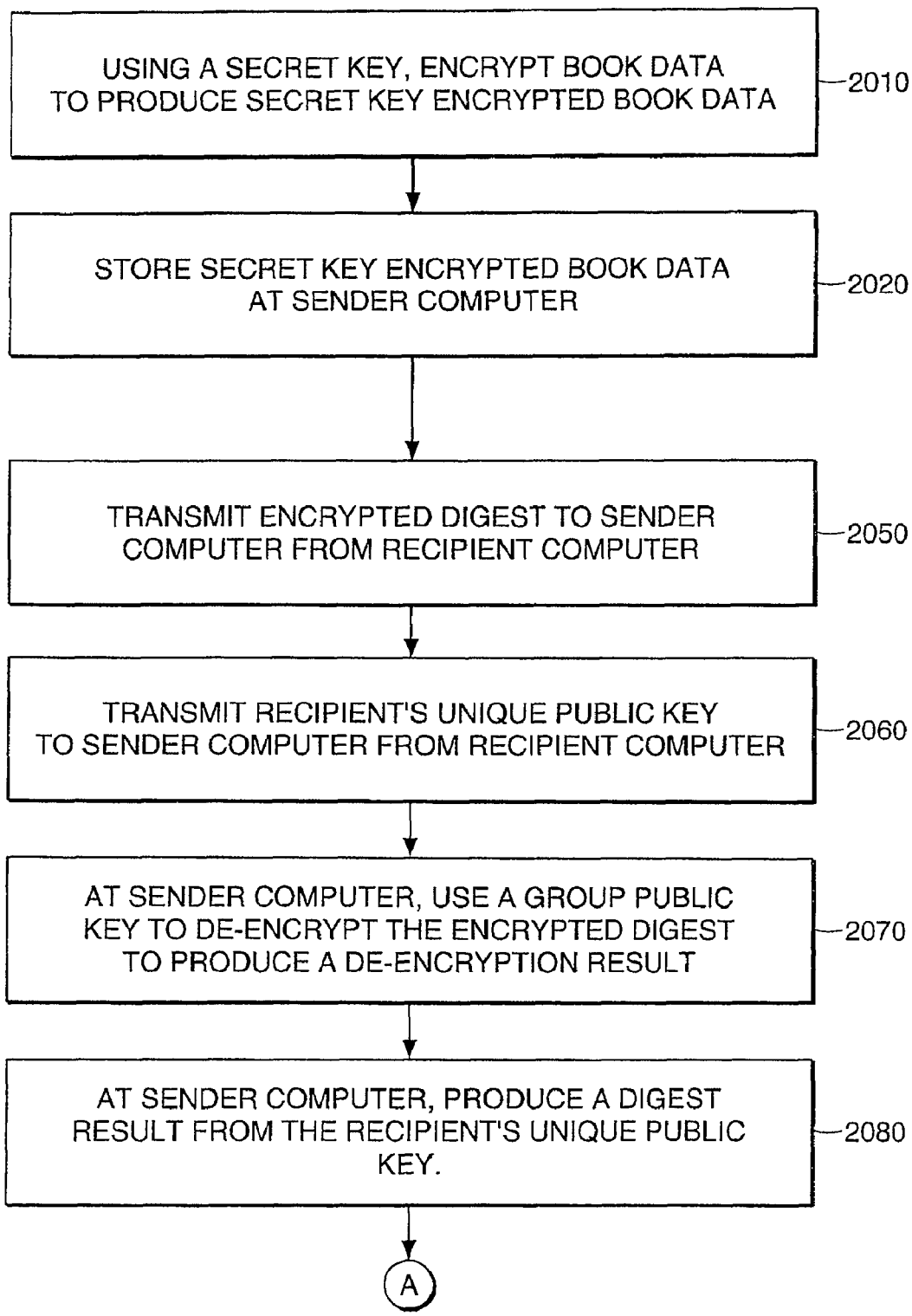
FIGS. 12-14 are flow diagrams of a usage permission transfer procedure.
Figure 13:
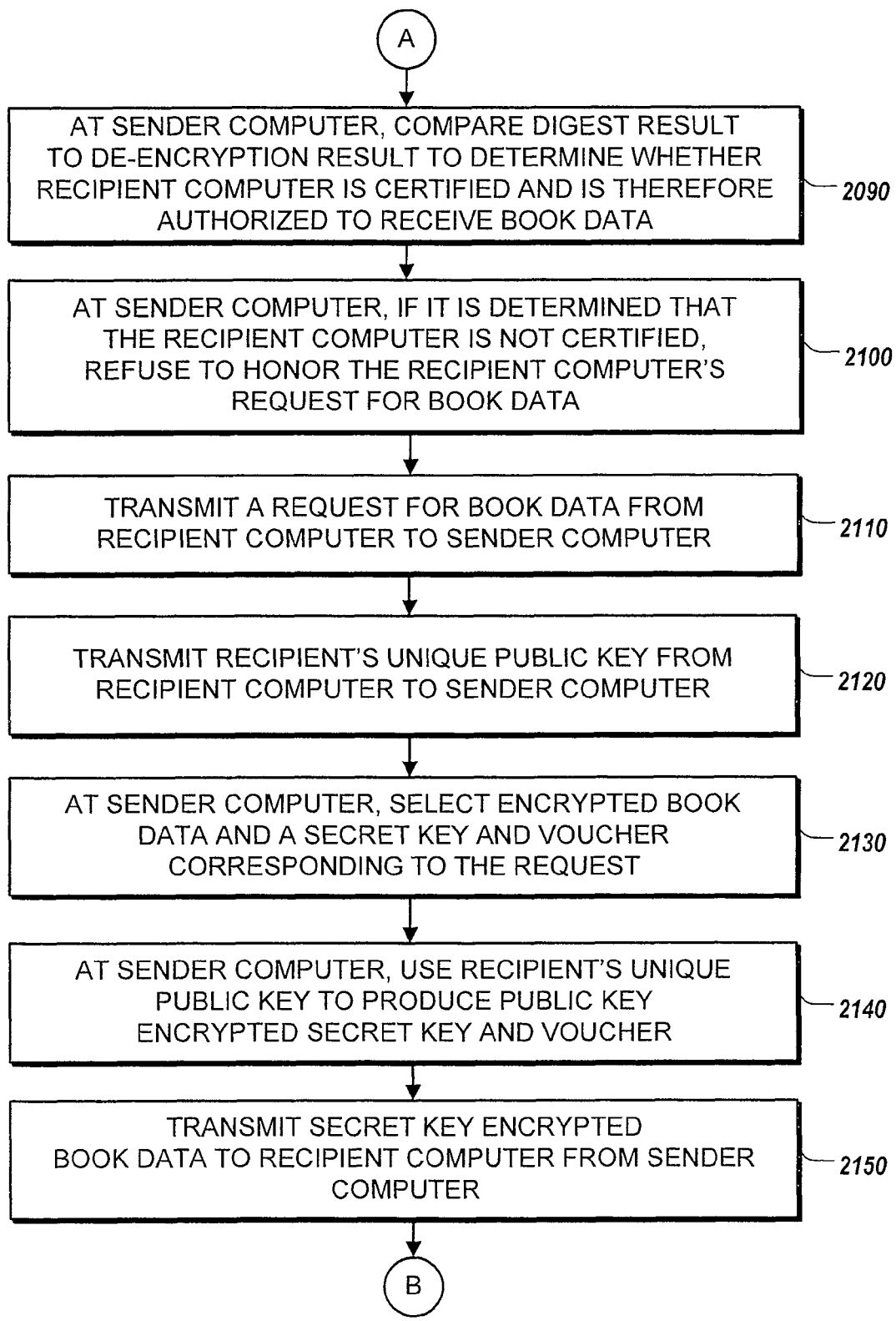
Figure 14:
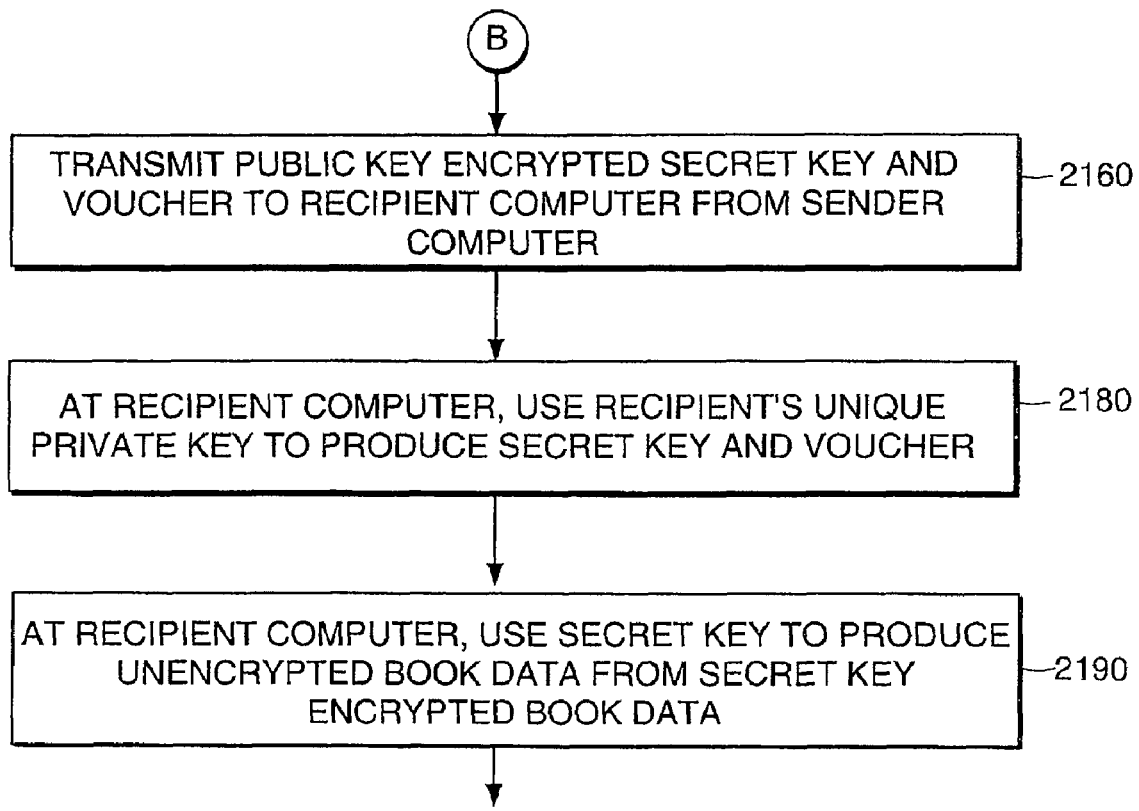

As shown in FIG. 10, a request for book data 90 and the recipient computer's unique public key are transmitted from the recipient computer to the sender computer (steps 2110, 2120). (In a specific embodiment, the request is associated at the recipient computer with a unique request serial number and with a request expiration time such as 60 seconds so that the request is cancelled at the request expiration time if a response is not received from the sender computer in time, and any response from the sender computer to the request is associated with the same unique request serial number so that the response can be matched to the request at the recipient computer.) At the sender computer, secret key encrypted book data and a secret key and voucher corresponding to the request are selected (step 2130), and the recipient's unique public key is used to produce a public key encrypted secret key and voucher 94 (step 2140), which is transmitted along with the secret key encrypted book data to the recipient computer from the sender computer (steps 2150, 2160).

At the recipient computer (FIG. 11), the recipient's unique private key is used to produce a secret key and voucher 98 (step 2180), and the secret key is used to produce unencrypted book data 100 from the secret key encrypted book data (step 2190).

At this point, the unencrypted book data may be displayed or otherwise used at the recipient computer.

In at least some cases, it may be advantageous if the unencrypted book data is in a format (e.g., a version of an Adobe format known as Portable Document Format or "PDF") that allows the data to be displayed in a specified way (e.g., by Adobe display software) but renders printing the data or reformatting the data difficult or impossible. See Portable Document Format Reference Manual, Version 1.2, November 1996, Adobe Systems, Inc. Thus, the originator of the unencrypted book data (e.g., a publisher) can have a high degree of confidence that the integrity of the book data will survive distribution and that the book data will be displayed in accordance with the originator's intent (e.g., in the intended fonts and type sizes and with intended line and page breaks).

The usage permission transfer procedure may be applied when permission to use a data item is lent (e.g., by a library), leased, given (e.g., as a birthday present), or sold (e.g., by a book retailer). If the permission is lent or leased, the procedure also specifies that the secret key is associated with matching expiration times 102S and 102R (e.g., each corresponding to a two-week period) at the sender and recipient computers, respectively, so that the secret key cannot be used (and therefore the data item cannot be used) at the sender computer until expiration time 102S is reached, and can be used at the recipient computer only until expiration time 102R is reached. In this way, the permission is effectively returned to the sender computer from the recipient computer when the expiration time is reached. If the sender computer or the recipient computer has permission data for multiple end-user computers for the same data item (e.g., in the case of a library that is able to lend to multiple end-user computers), matching serial numbers 104S and 104R are retained in each lend or lease transaction so that different instances of permission may be distinguished from each other. The voucher specifies the expiration times and the serial numbers, and also specifies a quantity 106 if the recipient computer is to be provided with permission data to allow more than one end-user computer to gain access to the data item (e.g., where a publisher computer provides a distributor computer with permission data with respect to 50 end-user computers). The voucher may also specify whether the recipient computer is permitted during the term of the lending or lease to serve as a sender computer for the specified data item in another usage permission transfer procedure with another recipient computer (e.g., to effectively sub-lend or sub-lease the permission).

In a case of giving or selling, the recipient computer is entitled to retain the secret key indefinitely, and to serve as a sender computer in a subsequent transaction. If at the start of the execution of the usage permission transfer procedure in a giving or selling context the sender computer had permission data to allow only one end-user computer (e.g., itself) to gain access to the data item, the secret key is erased at the sender computer after the recipient computer is provided with the secret key.

In a case of leasing or selling, the permission may be provided in exchange for funds, the delivery of which may be handled completely independently of the usage permission transfer procedure, or may be handled by another procedure that is tied to the usage permission transfer procedure to help ensure that permission is not provided before the funds are delivered. The sender computer may also create an audit file to permit revenue accounting.

At least because the data item, access to the data item, or both can be transferred from computer to computer (e.g., end-user computer to end-user computer) in accordance with the usage permission transfer procedure, the access or the data item or both are fungible and have a resale value, much as an automobile is fungible and has a resale value. For example, the usage permission transfer procedure makes it possible for an end-user to purchase or lease an instance of access to a book data item from a retailer for five dollars, enjoy the book data item (e.g., by reading the text of the book data item), and then sell the instance of access to another end-user (e.g., for more or less than five dollars, depending on whether the instance has appreciated for a reason such as scarcity or has depreciated for a reason such as a lack of a warranty against corrupted data).

In at least some cases, it is advantageous if at least the audit file, the secret key, the public/private key set, the permission data bank, the group private key, and the de-encryptors at each sender computer and recipient computer are stored and used in a highly secure way, e.g., in a smartcard computer as described above. If the smartcard computer 46 is used, security is enhanced if the group private key and the smartcard computer's unique private key are never transmitted in any form outside the smartcard computer (i.e., are never presented at the connection circuitry), and if the secret keys are never transmitted in unencrypted form. The encrypted data item may be stored separately from the keys (e.g., in a persistent memory such as a hard disk outside the smartcard computer due to limited data storage space within the smartcard computer). In any case, security is further enhanced if the encrypted data item is de-encrypted in only a piece at a time as necessary (e.g., a page at a time for display purposes).

Security may also be enhanced by the use of a secure network connection between the sender computer and the recipient computer. For example, in a specific embodiment, the sender computer includes a Web server computer to which the recipient computer is connected via a network that conforms at least in part to Internet standards such as HTML, HTTP, and TCP/IP (an "Internet network"). See Hyper Text Transfer Protocol—HTTP 1.1. RFC2068. In such a case, security is enhanced if the Internet network connection between the sender computer and the recipient computer operates according to a Secure Sockets Layer ("SSL") standard. See Secure Sockets Layer Specifications 3.0, Netscape, Inc. The Web server may serve as a demand-driven distribution center (e.g., for a publisher, a distributor, or a retailer) from which the recipient computer (e.g., for a distributor, a retailer, or an end-user) can download data items, which may be selectable (e.g., via a Web page on the Web server) at the recipient computer (e.g., running a Web browser). The recipient computer may download software (e.g., display software or software implementing at least a portion of the usage permission transfer procedure) from the sender computer.

The connection between the sender computer and the recipient computer may be accomplished by one or more wired or wireless data transmission technologies (e.g., modem dialup over telephone lines, cellular telephone, or infrared transmission).

Figure 15:
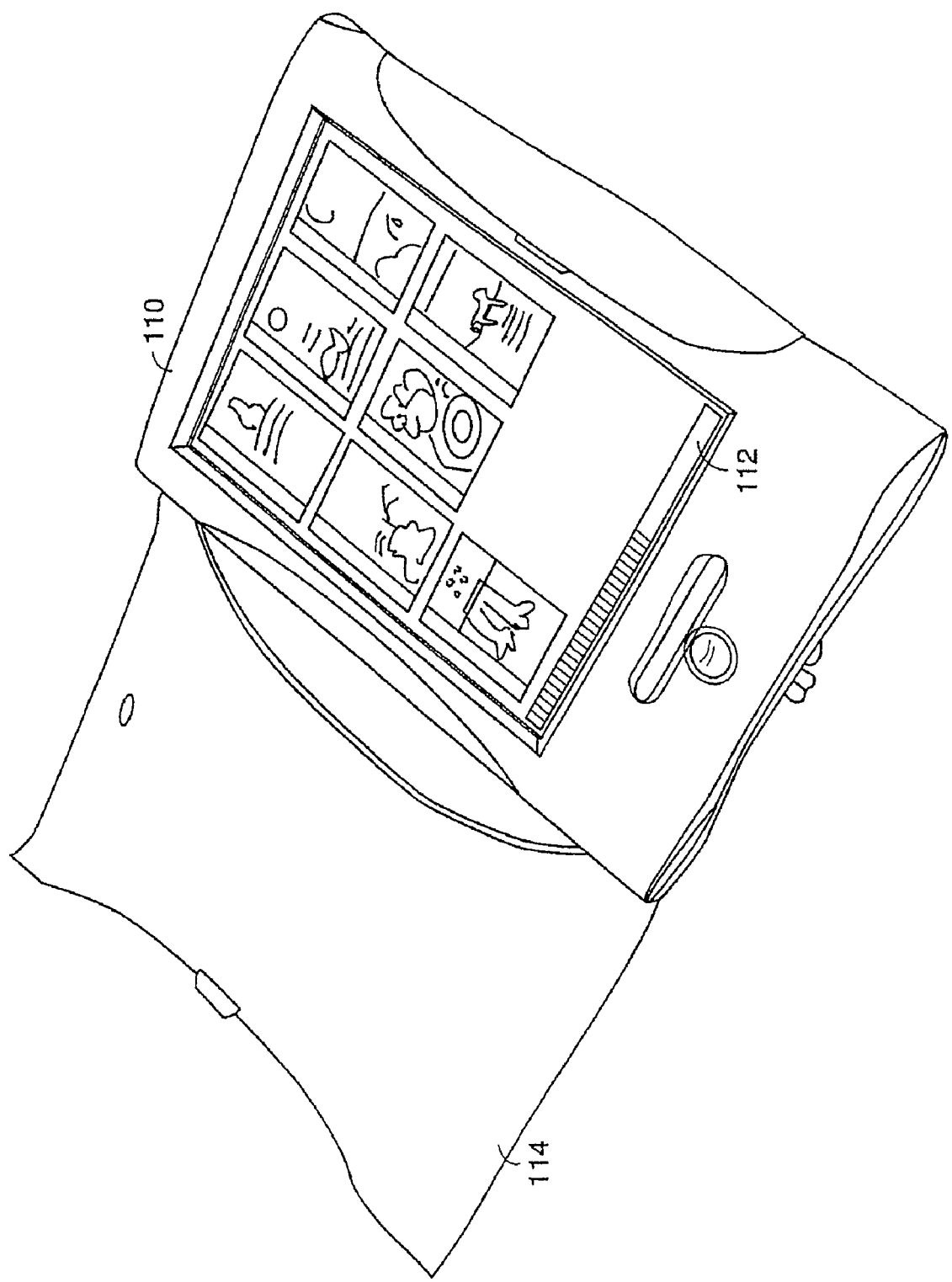
FIG. 15 is an illustration of a book viewing device.

In a specific embodiment, the sender computer or the recipient computer includes a special purpose book viewing computer 110 (FIG. 15) ("book reader") as now described. The book reader is a hand-held, battery-powered device that can be used to display book data (including textual information) clearly, and includes a 32-bit microcomputer (e.g., a Philips Semiconductor PR37100 MIPS processor or an Intel StrongARM 1100 processor, and UCB1200 peripheral control chips) running an operating system such as Microsoft Windows CE 2.1. A portrait-mode liquid crystal display ("LCD") screen 112 with supporting electronics (e.g., a Sharp HR-TFT LQ084V2DS01 8.4-inch VGA (640×480) reflective TFT color LCD, driven by an S-MOS Systems SED1355 video controller chip if the PR37100 processor is used) is also included in the book reader, which lacks a keyboard and a mouse. The book reader also has a 4-wire resistive touch screen with anti-glare coating, 16 MB DRAM, 8 MB Flash ROM for the operating system and built-in software, a compact Flash memory slot with an 8 MB flash memory card for book data storage, and an IrDA infrared interface capable of using built-in capabilities of the microcomputer for personal computer connectivity. Further, the book reader has an RJ-11 telephone jack, a DAA and modem interface using built-in capabilities of the microcomputer and Softmodem software for a direct Internet connection, "Next Page", "Prev Page", "Menu", "Enter", and "Reset" pushbuttons, and a sliding mode switch having "Off", "Read", "Books", "Library", and "Bookstore" positions. Also included in the book reader are four AA batteries (if alkaline, good for more than 40 hours of operation) and an AC-adapter power supply with support for power-conservation modes (e.g., of the microcomputer), a high-quality touch-screen stylus, and a smartcard slot for the smartcard computer.

The book reader is packaged to resemble or suggest a leather-bound book, is approximately 8 inches high by 5.25 inches wide, and is as thin and light-weight (e.g., about 1.5 pounds) as is practical in view of the included components. The LCD screen is oriented vertically (i.e., 480×640) and an LCD bezel around the LCD screen is as small as practical without unduly degrading durability. The "Next Page" and "Prev Page" pushbuttons are recessed and substantially centered on the right and left sides of the LCD bezel. The "Menu" and related pushbuttons are disposed on the bottom of the LCD bezel. The pushbuttons are comfortable and easy to press, and are nearly completely silent but provide significant tactile feed-back when pressed. The sliding mode switch is recessed and is disposed on the right side of the book reader. The Reset button is deeply recessed so that a ball-point pen or similar device is required to cause activation of the Reset button. An infrared transceiver bezel is disposed on the top edge of the book reader, the RJ-11 and AC power adapter jacks are disposed on the bottom edge of the book reader, and the compact Flash memory slot is disposed on the back of the book reader. The book reader's exterior is made of magnesium, which enhances the aesthetics and durability of the book reader, and is covered by an attached folding leather cover 114 to protect the book reader and the book reader's LCD screen.

In at least some cases, it is advantageous if the book reader is visually elegant, with fine detailing, includes rich-looking materials (e.g., leather, glass, magnesium) and plastic rubber-like hand grips, and is substantially weather-proof (e.g., has gaskets around the display and the buttons) and highly durable.

In other specific embodiments, the sender computer or the recipient computer may include a notebook computer or a desktop computer. In either case, the highly secure mechanism may include highly secure data files or highly secure software or both, or may include a smartcard computer (e.g., attached to a serial, parallel, or USB port, plugged into a PCMCIA smartcard adapter, or integrated in the form of a device embedded on a motherboard).

The technique (i.e., the procedures described above) may be implemented in hardware or software, or a combination of both. In at least some cases, it is advantageous if the technique is implemented in computer programs executing on programmable computers (e.g., a personal computer running or able to run Microsoft Windows 95, 98, or NT, or Macintosh OS) that each include a processor, a storage medium readable by the processor (including volatile and non-volatile memory and/or storage elements), at least one input device such as a keyboard, and at least one output device. Program code is applied to data entered using the input device to perform the method described above and to generate output information. The output information is applied to one or more output devices such as a display screen of the computer.

In at least some cases, it is advantageous if each program is implemented in a high level procedural or object-oriented programming language such as Java or C++ to communicate with a computer system. However, the programs can be implemented in assembly or machine language, if desired. In any case, the language may be a compiled or interpreted language.

In at least some cases, it is advantageous if each such computer program is stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the recipient computer may include a desktop or portable computer that includes circuitry (e.g., a dongle that attaches to a port of the computer, or a plug-in or PCMCIA card with memory devices embedded in epoxy) that helps to perform at least some of the functions performed by the smartcard computer as described above. In such a case, the data item may be displayed on the desktop or portable computer's display screen.

At least some of the functions performed by the smartcard computer may be performed completely or substantially in software instead, which may not be an arrangement that is as secure as the use of the smartcard computer.

The data item may include any type of data, including the text of a periodical (e.g., a magazine), audio data (e.g., music), or visual data (e.g., still pictures or video).

Other techniques may be used to help to prevent unauthorized dissemination of the group private key or the negative consequences of such dissemination. For example, it may be arranged that the group private key is retrievable only by a complex spread-spectrum wireless transfer technique or is otherwise further protected in hardware, or is effective only temporarily.

For a reason such as a reduction in transaction time between the sender computer and the recipient computer, the encrypted data item may be stored in a publicly accessible location (e.g., on the Internet) so that only the permission data need be transferred from the sender computer to the recipient computer. In such a case, the encrypted data item may be freely transferred and copied by anyone, but the permission data is transferred only under the control of the usage permission transfer procedure.

What is claimed is:

1. A computer-implemented method, comprising:
verifying that a first computer is in the same group as a second computer, the first computer storing first permission data allowing a first number of end users to access an encrypted data item, each group member identified as a publisher computer, distributor computer, retailer computer or end-user computer, where members of the group are associated with a common group key, and group membership is established, in part, by encrypting a signature using the group key;
transferring second permission data from the first computer to the second computer, the second permission data allowing access to the encrypted data item for a second number of end-users through the second computer, where the second number does not exceed the first number; and
reducing the first number of end users.

2. The method of claim 1, where:
the first computer is a distributor computer and the second computer is a retailer computer.

3. The method of claim 1, where:
the first computer is a distributor computer and the second computer is a distributor computer.

4. The method of claim 1 where:
the group members are ordered and transferring second permission data is between two adjacent members in the order.

5. The method of claim 1 where the transferring includes:
transferring the second permission data from the first computer to an intermediary computer, and from the intermediary computer to the second computer.

6. The method of claim 1, further comprising:
providing a key from the first computer to the second computer which can be used to decrypt the data item.

7. The method of claim 1 where:
the second permission data includes an expiration time indicating when access to the data item for the end-users will be disabled.

8. A computer program product, encoded on a computer-readable storage device, operable to cause a data processing apparatus to perform operations comprising:
verifying that a first computer is in the same group as a second computer, the first computer storing first permission data allowing a first number of end users to access an encrypted data item, each group member identified as a publisher computer, distributor computer, retailer computer or end-user computer, where members of the group are associated with a common group key, and group membership is established, in part, by encrypting a signature using the group key;
transferring second permission data from the first computer to the second computer, the second permission data allowing access to the encrypted data item for a second number of end-users through the second computer, where the second number does not exceed the first number; and
reducing the first number of end users.

9. The program product of claim 8 where:
the first computer is a distributor computer and the second computer is a retailer computer.

10. The program product of claim 8 where:
the first computer is a distributor computer and the second computer is a distributor computer.

11. The program product of claim 8 where:
the group members are ordered and transferring second permission data is between two adjacent members in the order.

12. The program product of claim 8 where the transferring includes:
transferring the second permission data from the first computer to an intermediary computer, and from the intermediary computer to the second computer.

13. The program product of claim 8, further comprising:
providing a key from the first computer to the second computer which can be used to decrypt the data item.

14. The program product of claim 8 where:
the second permission data includes an expiration time indicating when access to the data item for the end-users will be disabled.

* * * * *